March 26, 1935. H. M. SMITH ET AL 1,995,330

PROCESS FOR TREATING GASEOUS HYDROCARBONS

Filed Jan. 25, 1934

INVENTORS,

March 26, 1935.  H. M. SMITH ET AL  1,995,330
PROCESS FOR TREATING GASEOUS HYDROCARBONS
Filed Jan. 25, 1934   2 Sheets-Sheet 2

INVENTORS,
Harold M. Smith
Peter Grandone
Harry V. Rall
BY,
ATTORNEY

Patented Mar. 26, 1935

1,995,330

UNITED STATES PATENT OFFICE 1,995,330

PROCESS FOR TREATING GASEOUS HYDROCARBONS

Harold M. Smith, Peter Grandone, and Harry T. Rall, Bartlesville, Okla.

Application January 25, 1934, Serial No. 708,288

7 Claims. (Cl. 260—168)

(Granted under the act of March 3, 1883, as amended April 30, 1928; 370 O. G. 757)

This invention described herein may be manufactured and used by or for the Government for governmental purposes, without the payment to us of any royalty thereon.

The present invention generically relates to thermal decomposition processes and constitutes an improvement over that described and claimed in pending application for the process for treating hydrocarbons, Serial No. 640,508, filed October 31, 1932, more particularly it is directed to a method and apparatus whereby saturated gaseous hydrocarbons are converted to useful liquid and gaseous products.

One object of this invention is to provide an improved method and apparatus for converting gaseous hydrocarbons typified by methane, ethane, propane, butane and isobutane, either collectively or separately into products valuable as motor fuels, solvents or organic intermediates.

Another object of this invention is to provide an improved method and apparatus by which certain portions of the tars formed concurrently with the light oils in the thermal decomposition of natural gas may be electrically separated while in the gaseous phase from the undesirable portions of the tar which are in the liquid or solid state.

Another object of this invention is to provide a method and apparatus whereby a large portion of the hydrogen which is of necessity formed by the thermal breakdown of the paraffin hydrocarbons may be utilized in the catalytic hydrogenation of the tarry materials in gaseous form resulting from electrical precipitation, thus preparing the gas for more efficient recycling.

Another object of this invention is to provide a method and apparatus wherein the gases after leaving the cracking tube and prior to catalytic hydrogenation are subjected to the action of an electrical field at a predetermined temperature to effect extraction of the valuable constituents of the tar.

Another object of this invention is to provide a method and apparatus for the pyrolytic synthesis of light oils from natural gas wherein between the endothermic and the catalytic hydrogenation stages products are extracted which when subjected to hydrogenation yield tetrahydronaphthalene and other valuable light oils.

With these and other objects in view this invention consists in certain novel details of construction, combination and arrangement of parts to be more particularly hereinafter set forth and claimed.

Briefly stated, this invention consists of an endothermic stage in which the raw gas is heated to a temperature sufficient to crack the hydrocarbons, the velocity of the gas being regulated to provide optimum yield of secondary production and hydrogen, an electrical precipitation stage in which the products of pyrolysis are subjected to the action of a high potential electrical field at a definite temperature to extract the materials which are liquid or solid at the temperature employed, a catalytic hydrogenation stage wherein the products still in the gaseous or vaporous stage after the action of the electrical field are directed over a suitable catalyst in the presence of hydrogen to produce light oils which latter are separated and removed in the final or recovery stage of the process.

Referring more particularly to the accompanying drawings in which corresponding parts are indicated by similar reference characters:

Figure 3:
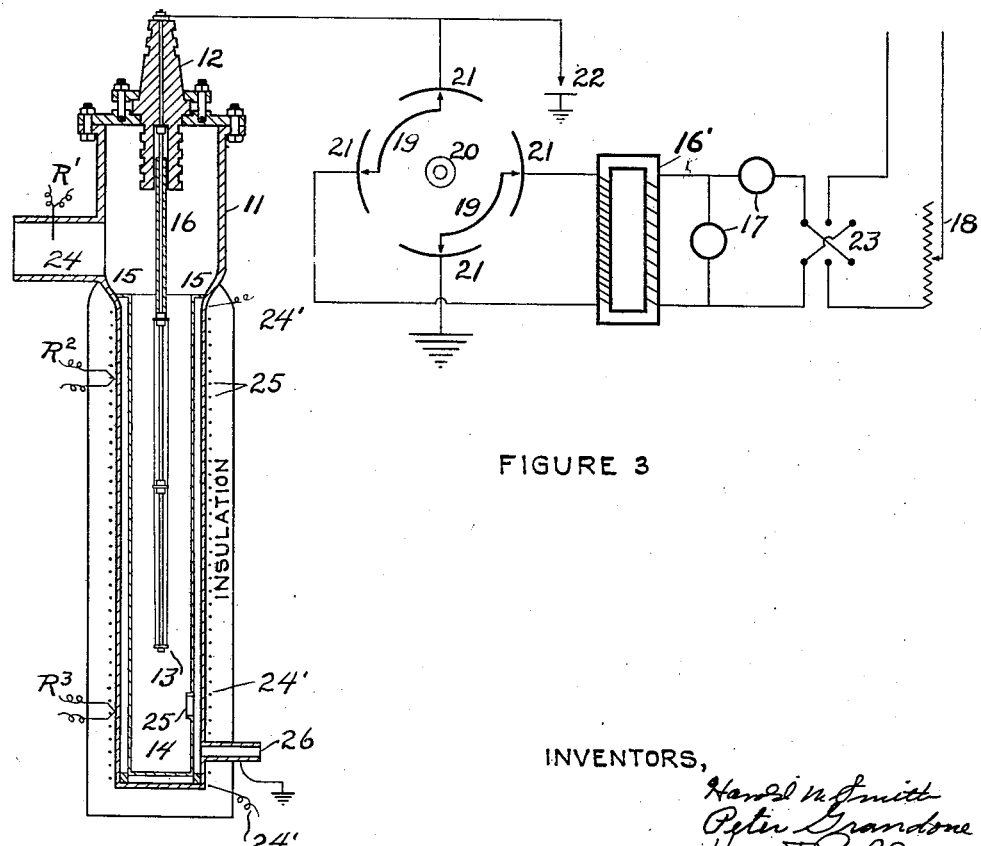
Fig. 3 is a transverse vertical section partly in elevation of the electrical precipitation apparatus with its connections diagrammatically shown.

In general, when natural gas hydrocarbons are subjected to high temperature, a splitting of the simple hydrocarbons takes place which after subsequent polymerization of the "free radicals" leads to the formation of a large number of new hydrocarbons of the aromatic series. Distillation of the liquid and solid products of pyrolysis yields, as shown by the distillation curve (Fig. 3), about 40 percent benzene, a liquid valuable as a blend for motor fuels and approximately 10 percent naphthalene, a solid melting at about 80° C. and of no value as a fuel. In addition to the benzene and naphthalene are found considerable quantities of other solid compounds such as anthracene and pyrene.

Produced concurrently with the substances shown on the curve are small amounts of very heavy hydrocarbons and carbon which interfere materially with the efficient working of the catalyst. In the light of this distillation curve it is apparent that if the naphthalene constituent could be converted into a liquid suitable for motor fuel the yield of valuable light oils would be materially increased, but this conversion of naphthalene into a hydrogenated product such as tetrahydronaphthalene remained an unsolved problem until the instant method of separating the naphthalene from pyrolyzed gaseous hydrocarbons.

Coming now to a more detailed discussion of the application of the process under consideration the gaseous mixture to be processed enters at a definite and predetermined flow rate a reaction tube maintained at a constant and predetermined temperature so that the desired amount of cracking and conversion to light oils and tars may be accomplished. The conditions necessary for such operation will differ with different gases, but in general the procedure for the cracking will follow the disclosures set forth in application for Improvements in the process of treating hydrocarbons, Serial No. 629,734 and 640,508, filed August 19 and October 31, 1932, respectively. The gases issuing from the reaction tube will consist largely of uncracked raw gas, unsaturates such as ethylene, and aromatic substances such as benzene, naphthalene, anthracene, pyrene and still heavier hydrocarbons and possibly small amounts of carbon together with a considerable amount of hydrogen.

As the next step in the process it is proposed to cool this mixture of gases and vapors until all of the heavier hydrocarbons are condensed to a liquid or solid condition and while they are in this condition the entire mixture is passed through a high potential electrical field. Here the liquid and solid particles will become charged and then migrate to the oppositely charged wall of the treating apparatus and there lose their charge and precipitate on the walls. If during this time the temperature of the mixture is such that no further condensation can take place then the remainder of the gases and vapors will pass through the precipitator into catalytic hydrogenation chambers. The temperature necessary to condense the undesirable portion of the tar and still allow the useful part to remain in a gaseous condition will vary considerably depending upon the velocity of the gas stream and the amount of condensible and useful material in the tar.

In the particular experimental apparatus used in developing this invention the precipitator was maintained at a 100° C. using a potential of about 13,000 volts and a linear gas velocity through the precipitating zone of about one inch per second. However, it should be understood these conditions are for the particular apparatus employed and are not to be considered as the proper conditions for every case.

The next step in the process consists in passing the gases issuing from the electrical precipitator into a catalyst chamber containing the hydrogenating catalysts, the chamber being maintained at such a temperature that the unsaturated hydrocarbons and the polynuclear aromatic constituents of the tar are hydrogenated by utilization of the hydrogen previously formed in the cracking operation, as clearly set forth in our copending application serially numbered 640,508, filed October 31, 1932.

The final step in the process consists in directing the gaseous mixture issuing from the hydrogenator and consisting of fixed gases and vapors, into a recovery system consisting of a suitable arrangement of coolers, scrubbers or other appropriate devices for separating the components of the gaseous mixture. The particular apparatus and arrangement used for this purpose may be varied considerably dependent upon the nature of the products to be recovered and the ultimate disposition of the residue gas.

The process as described above functions admirably at atmospheric pressure, but it is understood that we do not limit ourselves to this pressure, as certain of the reactions involved are greatly accelerated by elevated pressures. Static experiments have shown that up to somewhat over an atmosphere of hydrogen pressure, the initial velocity of the reaction is approximately proportional to the square of the initial hydrogen pressure. Suitable initial hydrogen pressures which are dependent upon the extent of cracking may be obtained at any total pressure from atmospheric to at least 100 pounds per square inch. Thus it is evident this process is entirely feasible over a pressure range of at least 1 to 100 pounds per square inch with pressures in the higher range more advantageous.

Figure 1:
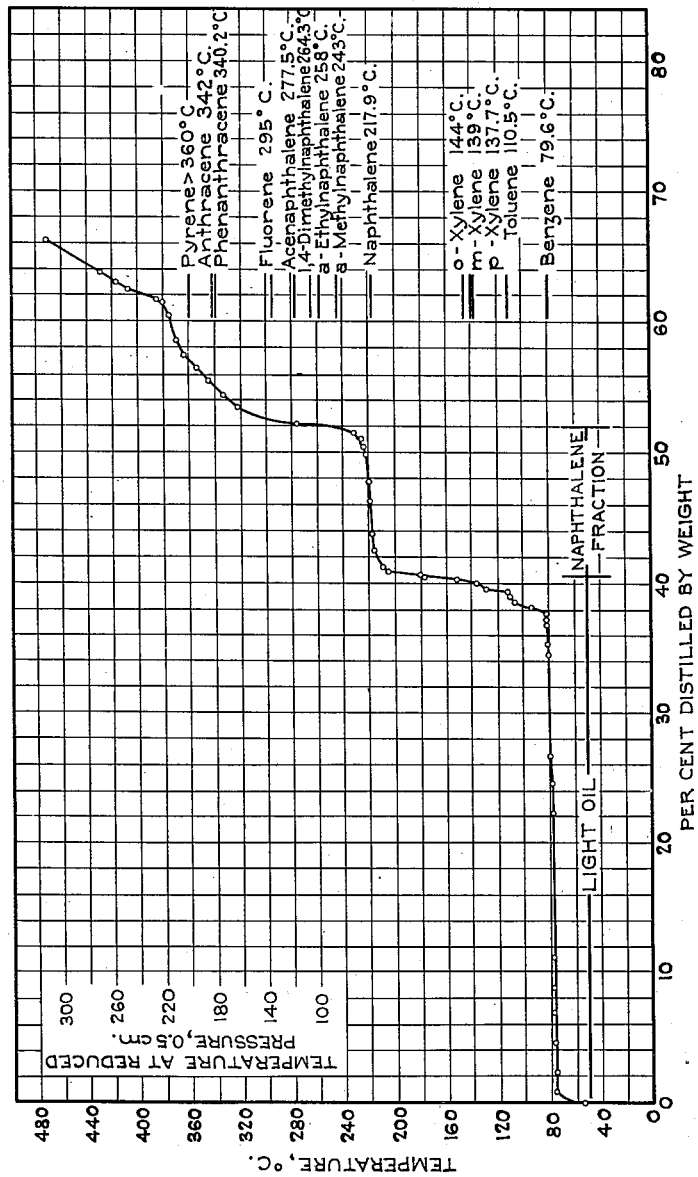
Fig. 1 is a distillation curve of the products obtained by the thermal decomposition of hydrocarbon gases.
Figure 2:
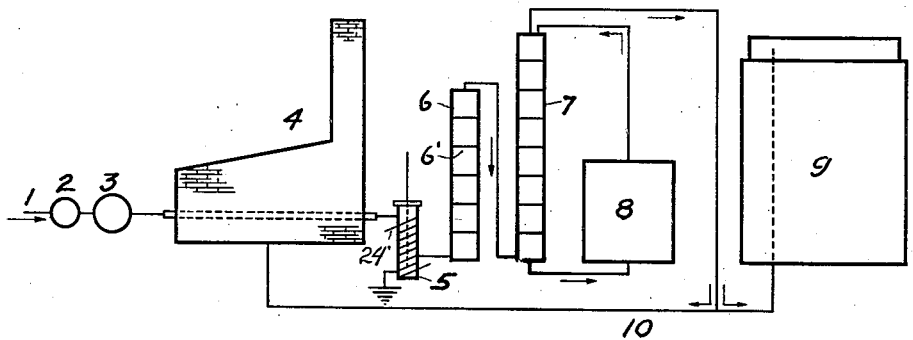
Fig. 2 is a diagrammatic view in elevation showing the several parts of this pyrolytic process operatively associated and illustrating the position of the electrical precipitation stage in relation to the other stages of the process.

Reference will now be made to Fig. 2 of the drawings which shows one form of apparatus successfully employed in the process forming the subject matter of this application. The gas to be cracked enters the system at (1), passes through the pressure regulator (2) and meter (3) into the cracking furnace (4). After having been maintained at an appropriate temperature for a definite time, the gases pass into the electrical precipitator (5), which is shown in greater detail in Fig. 3 of the drawings. Here the undesirable portions of the tar are separated by precipitation on the wall of the precipitator which is maintained at a definite temperature and the cleaned gases and vapors pass on to the catalyst chamber (6) where the naphthalene is converted into tetrahydronaphthalene. The gases and vapors coming from the hydrogenating chamber next enter an absorption tower (7) where the liquid products are condensed and recovered in the recovery unit (8). The uncondensed gases then may be sent to the fuel line (10) or stored in gasometer (9).

Electrical precipitator (5) (see Fig. 3) consists of an iron shell (11) at the top of which an insulator (12) is clamped by a flange union. This insulator must be made of material which will provide sufficient insulation to prevent arcing of the high voltage current under the temperature and pressure conditions employed. A "squirrel cage" electrode (13) is attached to the insulator and hangs axially within an aluminum cup (14). This cup rests on a ground joint at (15) and the tar is thus prevented from entering the annular space between the cup and the outside shell. A porcelain tube (16) retards electrical precipitation of the tar in the space above the cup (14).

A high voltage current is supplied by a transformer (16). The high voltage and amperage on the primary side being indicated by instruments (17) and controlled by rheostat (18). The current is rectified by a mechanical rectifier which consists of a four-point rotary switch (19) driven by a synchronous motor (20). This switch contacts four shoes (21) by arcing through a very small gap. Two of these shoes connect to the secondary of the transformer and the other two are the remaining terminals for the unidirectional high voltage current. Of these latter two, one shoe is grounded while the other one leads directly to the electrode in the precipitator. The direction of the current is indicated by spark gap (22). This consists of a grounded plate and a discharge point connected to the other side of the line. When the current is flowing in the proper direction to precipitate tar on the wall of the aluminum cup, there will be no discharge in the spark gap if it is properly adjusted. However, if the current is such that the deposition of tar will be on the electrode then there will be a strong arc from the point to the plate. The direction of the current may be reversed at will by means of a switch (23). The spark gap (22) is also used to roughly determine the points of maximum rectification by changing the position of the stator with respect to its mountings on the motor until an arc of maximum length, using constant voltage, is obtained at (22).

When the electrical precipitator (5) is arranged as shown in Fig. 2 the cracked gas enters the precipitating chamber at (24) and then passes through the cup (14) where the solid and liquid particles are separated from the gases and vapors which leave at (25) and (26). The precipitating chamber may be maintained at the correct temperatures to effect the separation by means of a heater (24) wound on the outside of the iron shell. The temperatures are determined by thermo-couples $R^1$, $R^2$ and $R^3$.

The following example will illustrate the extent to which the precipitator fulfills its purpose in connection with a pyrolytic unit. Cracked gas was passed through a precipitating chamber maintained at approximately 100° C. and 75 pounds gauge pressure. The gas and vapors leaving the precipitator were passed through a bomb cooled in ice to condense the naphthalene. There were 4.5 grams of black tar in the aluminum cup and 1.39 grams of light brown naphthalene crystals in the cold trap indicating that 23.6 per cent of the tar had passed through the precipitator. Since several analyses of untreated tar have shown the presence of 20–25 per cent naphthalene, it appears that the precipitator can separate the naphthalene efficiently under proper operating conditions.

The following data will serve as an example of a successful run with this type of apparatus. Gas containing 64.79 per cent methane, 3.71 per cent ethane, 1.89 per cent propane, .98 per cent butane, .39 per cent pentane plus, and the balance nitrogen was cracked at 880° C. and 75 pounds gauge pressure with a contact time of 4.5 seconds. This gave a cracked gas containing about 12 per cent hydrogen, corresponding to a hydrogen pressure of about 56 centimeters of mercury. This cracked gas carried with it the vapors of about 416 grams of tar and 650 grams of light oil per 1000 cubic feet of inlet gas. The gas and vapors next entered the precipitator chamber which was maintained at 100° C. with a potential difference across the electrodes of about 14,000 volts. Here about 300 grams of tar per 1000 cubic feet was removed and the remainder of the tar, now largely naphthalene, entered the hydrogenating chamber together with the gas. This chamber was filled with a catalyst made of acid treated pumice impregnated with nickel at a concentration of about 0.25 gram of nickel per gram of pumice. The chamber was maintained at 200° C. The gases and vapors, after passing over this catalyst still contained the same amount of light oil, but in addition there was present tetrahydronaphthalene to the extent of about 110 grams per 1000 cubic feet of inlet gas. These figures show that approximately 26 per cent of the tar was passed through the precipitator as naphthalene and then hydrogenated in the catalyst tower to form the liquid derivative tetrahydronaphthalene.

Returning now to the catalytic hydrogenation stage of the process under consideration, the gases and vapor coming from the hydrogenation tower next enter an absorption tower where the liquid products are absorbed and later extracted in the recovery unit 8. The uncondensed gases may be sent to the fuel line 10 or stored in the gasometer 9.

It is obvious that those skilled in the art may vary the details of construction and arrangement without departing from the scope and spirit of the invention, and therefore it is not desired to be limited to the foregoing description except as may be required by the claims.

Having described our invention, what we claim as new and wish to secure by Letters Patent is:

1. A process for treating gaseous paraffin hydrocarbons by thermal decomposition and catalytic hydrogenation, consisting in cracking the gases within a temperature and pressure range which will limit secondary reactions and provide an optimum yield of aromatic hydrocarbons, directing the heated gases into a cooling chamber, communicating with an electrical precipitator to cool said gases until all of the heavier hydrocarbons are condensed to a liquid or solid state and while in this condition directing the entire mixture at a predetermined temperature and velocity through the high potential field in said electrical precipitator, extracting the condensates, removing the purified light oils and desirable constituents of the tars while still in the vapor state from the electrical precipitation chamber, passing them over a hydrogenating catalyst at a definite temperature, pressure and velocity and then extracting the liquid products formed.

2. A process for treating gaseous paraffin hydrocarbons by thermal decomposition and catalytic hydrogenation, consisting in cracking the gases within a temperature and pressure range sufficient to limit secondary reactions and provide an optimum yield of aromatic hydrocarbons, cooling the mixture of gases and vapors from the cracking stage until all of the heavier hydrocarbons have been condensed to a liquid or solid state, directing the mixture of gases, vapors and condensates through a high potential electrical field at a temperature, pressure and velocity which will prevent further condensation and effect extraction of the heavier hydrocarbons, directing the residue gases and vapors over a hydrogenating catalyst at a definite temperature, pressure and velocity and then extracting the liquid products formed.

3. A process for treating gaseous paraffin hydrocarbons by thermal decomposition and catalytic hydrogenation, consisting in cracking the gases within a temperature and pressure range sufficient to limit secondary reactions and provide an optimum yield of aromatic hydrocarbons, cooling the mixture of gases and vapors from the cracking stage until all of the heavier hydrocarbons have been condensed to a liquid or solid state, directing the mixture of gases, vapors and condensates through a high potential electrical field at a temperature of approximately 100° C. and at a pressure and velocity which will prevent further condensation and effect extraction of the heavier hydrocarbons, directing the residual gases and vapors over a hydrogenating catalyst at a definite temperature, pressure and velocity and then extracting the liquid products formed.

4. A process for treating gaseous paraffin hydrocarbons by thermal decomposition and catalytic hydrogenation, consisting in cracking the gases within a predetermined temperature range and at a pressure of 1-100 pounds per square inch to limit secondary reactions and provide an optimum yield of aromatic hydrocarbons, cooling the mixture of gases and vapors from the cracking stage until all of the heavier hydrocarbons have been condensed to a liquid or solid state, directing the mixture of gases, vapors and condensates through a high potential electrical field at a temperature, pressure and velocity which will prevent further condensation and effect extraction of the heavier hydrocarbons, directing the residual gases and vapors over a hydrogenating catalyst at a definite temperature, pressure and velocity and then extracting the liquid products formed.

5. A process for treating gaseous paraffin hydrocarbons by thermal decomposition and catalytic hydrogenation, consisting in cracking the gases within a predetermined temperature range and at a pressure of 1-100 pounds per square inch to limit secondary reactions and provide an optimum yield of aromatic hydrocarbons, cooling the mixture of gases and vapors from the cracking stage until all of the heavier hydrocarbons have been condensed to a liquid or solid state, directing the mixture of gases, vapors and condensates through a high potential electrical field at a temperature of approximately 100° C. and at a pressure and velocity to prevent further condensation and effect extraction of the heavier hydrocarbons, directing the residual gases and vapors over a hydrogenating catalyst at a definite temperature, pressure and velocity and then extracting the liquid products formed.

6. A process for treating gaseous paraffin hydrocarbons by thermal decomposition and catalytic hydrogenation, consisting in cracking the gases within a predetermined temperature range and at a pressure of 1-100 pounds per square inch to limit secondary reactions and provide an optimum yield of aromatic hydrocarbons, cooling the mixture of gases and vapors from the cracking stage until all of the heavier hydrocarbons have been condensed to a liquid or solid state, directing the mixture of gases, vapors and condensates through a high potential electrical field at a temperature, pressure and velocity to prevent further condensation and effect extraction of the heavier hydrocarbons, directing the residual gases and vapors over a hydrogenating catalyst at a temperature of approximately 200° C. and with a spaced velocity sufficient to effect hydrogenation and then extracting the liquid products formed.

7. A process for the production of tetrahydronaphthalene by the thermal decomposition of gaseous paraffin hydrocarbons followed by the subsequent catalytic hydrogenation of the naphthalene formed, consisting in cracking the gases within a predetermined temperature range and at a pressure of 1-100 pounds per square inch, so that a maximum amount of naphthalene is formed, cooling the mixture of gases and vapors from the cracking stage until all of the heavier hydrocarbons have been condensed to a liquid or solid state, directing the mixture of gases, vapors and condensates through a high potential electrical field at a temperature, pressure and velocity to prevent further condensation and effect extraction of the heavier hydrocarbons, removing the hot gases and naphthalene while still in a vapor state and passing them over a hydrogenating catalyst under conditions of temperature, pressure, spaced velocity and catalytic activity to convert the naphthalene to a tetranaphthalene and then directing the vapors through a condensing system to separate the tetrahydronaphthalene.

HAROLD M. SMITH.
PETER GRANDONE.
HARRY T. RALL.